(12) United States Patent
Masias

(10) Patent No.: US 9,768,433 B2
(45) Date of Patent: Sep. 19, 2017

(54) MULTI-LAYERED TERMINAL HAVING THERMAL FUSE FOR A TRACTION BATTERY CELL

(71) Applicant: Ford Global Technologies, LLC, Dearborn, MI (US)

(72) Inventor: Alvaro Masias, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 333 days.

(21) Appl. No.: 14/519,508

(22) Filed: Oct. 21, 2014

(65) Prior Publication Data

US 2016/0111704 A1    Apr. 21, 2016

(51) Int. Cl.
*H01M 2/34* (2006.01)
*H01M 2/30* (2006.01)
*H01M 2/10* (2006.01)
*H01M 2/12* (2006.01)

(52) U.S. Cl.
CPC ........... *H01M 2/30* (2013.01); *H01M 2/1077* (2013.01); *H01M 2/34* (2013.01); *H01M 2/1235* (2013.01); *H01M 2200/00* (2013.01); *H01M 2220/20* (2013.01)

(58) Field of Classification Search
CPC ........ H01M 2/348; H01M 2/30; H01M 2/237; H01M 2/1235
See application file for complete search history.

(56) References Cited

U.S. PATENT DOCUMENTS

| 6,475,666 | B1 | 11/2002 | Takeuchi |
| 2002/0113685 | A1* | 8/2002 | Izaki ................. H01H 37/761 337/405 |
| 2007/0018610 | A1* | 1/2007 | Wegner ............... H01M 2/0212 320/112 |
| 2013/0196216 | A1 | 8/2013 | Hwang |
| 2013/0280578 | A1 | 10/2013 | Yang et al. |
| 2013/0323548 | A1 | 12/2013 | Iwamoto |

FOREIGN PATENT DOCUMENTS

| JP | 2006079932 A | 3/2006 |
| WO | 2011157230 A1 | 12/2011 |

* cited by examiner

*Primary Examiner* — Stewart Fraser
*Assistant Examiner* — Rachel L Zhang
(74) *Attorney, Agent, or Firm* — Damian Porcari; Brooks Kushman P.C.

(57) ABSTRACT

A vehicle traction battery assembly which may include an array of battery cells is provided. Each of the cells includes terminals of opposite polarity. Each of the terminals may have a plurality of segment layers, and at least one of the segment layers of each of the terminals may have a melting point less than that of adjacent segment layers on either side thereof. One of the cells may be electrically isolated from other of the cells in response to at least one of the segment layers of the terminals of the one of the cells melting. The assembly may also include a housing, and the segment layers having a melting point less than that of adjacent segment layers may be located outside of the housing. The segment layers having a melting point less than that of adjacent segment layers may be located within the housing.

14 Claims, 3 Drawing Sheets

MULTI-LAYERED TERMINAL HAVING THERMAL FUSE FOR A TRACTION BATTERY CELL

TECHNICAL FIELD

This disclosure relates to battery cells and battery cell terminals for high voltage batteries utilized in vehicles.

BACKGROUND

Vehicles such as battery-electric vehicles (BEVs), plug-in hybrid-electric vehicles (PHEVs), mild hybrid-electric vehicles (MHEVs), or full hybrid-electric vehicles (FHEVs) may contain an energy storage device, such as a high voltage (HV) battery, to act as a propulsion source for the vehicle. The HV battery may include components and systems to assist in managing vehicle performance and operations. The HV battery may include one or more arrays of battery cells interconnected electrically between battery cell terminals and interconnector busbars. The HV battery and surrounding environment may include a thermal management system to assist in managing temperature of the HV battery components, systems, and individual battery cells.

SUMMARY

A vehicle traction battery assembly includes an array of battery cells. Each of the cells includes terminals of opposite polarity. Each of the terminals have a plurality of segment layers, and at least one of the segment layers of each of the terminals has a melting point less than that of adjacent segment layers on either side thereof. One of the cells may be electrically isolated from other of the cells in response to at least one of the segment layers of the terminals of the one of the cells melting. The assembly may also include a housing, and the segment layers having a melting point less than that of adjacent segment layers may be located outside of the housing. The segment layers having a melting point less than that of adjacent segment layers may be located within the housing. For each of the terminals, the plurality of segment layers may be arranged such that the adjacent segment layers on either side of the at least one of the segment layers are disconnected from one another in response to the at least one of the segment layers melting. For each of the terminals, the adjacent segment layers on either side of the at least one of the segment layers may be copper or aluminum. For each of the terminals, the at least one of the segment layers may be indium.

A vehicle traction battery cell includes an electrochemical cell disposed within a housing. First and second terminals of opposite polarity electrically are connected with the cell and extend outside the housing. The terminals each includes a conductive segment disposed between lower and upper layers of the terminal, and has a melting point less than the lower and upper layers. The conductive segment may be disposed within the housing. The conductive segment may be disposed outside of the housing. The melting point may be equal to or less than a predefined temperature associated with a short-circuit condition of the cell. The melting point may be less than a terminal temperature at which thermal runaway of the cell occurs. The conductive segment may be a metal alloy and the melting point may be between seventy five degrees Celsius and one hundred and thirty degrees Celsius. The conductive segment may be sized such that, in response to the conductive segment melting, a gap forms between the lower and upper layers sufficient to prevent sparking between the lower and upper layers.

A vehicle includes an electric machine and an array of battery cells. The array of battery cells are configured to be electrically connected to the electric machine. Each of the cells is configured to convert chemical energy to electrical energy and include a housing and first and second terminals. The first and second terminals of opposite polarity are electrically connected to the cell. Each of the terminals extends outside of the housing and defines lower and upper layers and a middle layer disposed therebetween. The middle layer is of a material having a melting point defined by a terminal temperature at which a short-circuit condition of the cell occurs and being less than a melting point of the lower and upper layers. The middle layers may be disposed outside of the housing. The middle layers may be disposed within the housing. One of the cells of the array may be isolated from the rest of the cells of the array in response to the middle layers of the terminals of the one of the cells melting. The lower and upper layers may be disconnected when the middle layers melt. The middle layers may be made of indium.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
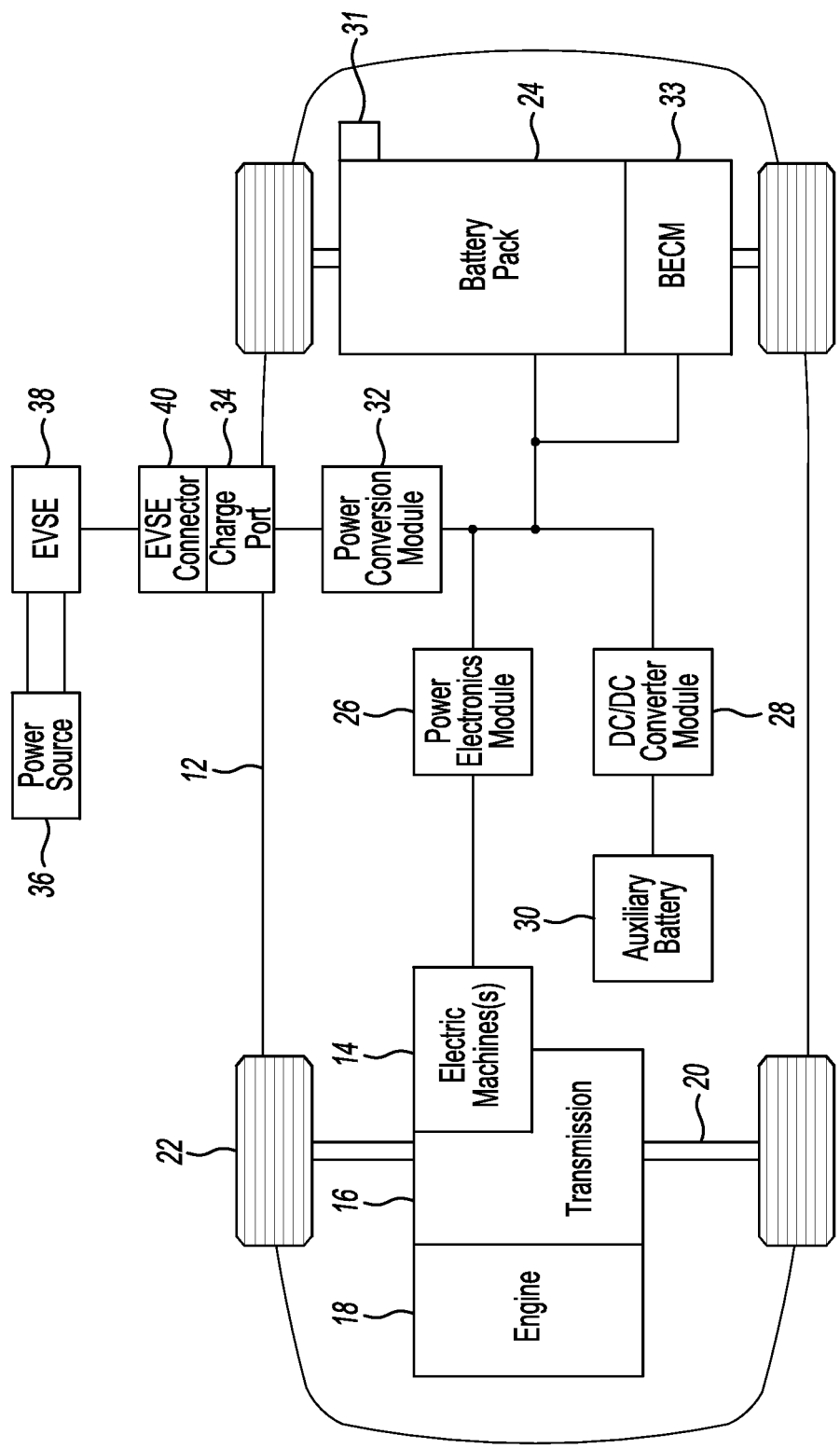
FIG. 1 is a schematic illustrating a battery electric vehicle.

FIG. 1 depicts a schematic of an example of a plug-in hybrid-electric vehicle (PHEV). A vehicle 12 may comprise one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 may provide propulsion and deceleration capability when the engine 18 is turned on or off. The electric machines 14 may also act as generators and provide fuel economy benefits by recovering energy that would normally be lost as heat in the friction braking system. The electric machines 14 may also provide reduced pollutant emissions since the hybrid-electric vehicle 12 may be operated in electric mode or hybrid mode under certain conditions to reduce overall fuel consumption of the vehicle 12.

A traction battery or battery pack 24 stores and provides energy that may be used by the electric machines 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors may isolate the traction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery electronic control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The vehicle 12 may be, for example, an electric vehicle such as a PHEV, a FHEV, a MHEV, or a BEV. The traction battery 24 may be recharged by an external power source 36 in certain electric vehicles. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells.

Battery cells ranging from one hundred to four hundred volts are typically utilized in electrified vehicles to optimize performance of electrified vehicle components such as motors, inverters, and converters. Twelve volt battery cells may be utilized with certain start/stop applications in electrified vehicles. In certain examples and depending on a type of battery cell chemistry used in a particular battery cell system or traction battery pack, these voltages can be reached by placing approximately thirty to one hundred twenty lithium ion battery cells, or ninety to three hundred sixty nickel metal hydride battery cells in series. Regardless of the type of battery cell chemistry, it is desirable to avoid short-circuiting the battery cells as a short circuit may result in one or more unsafe conditions.

Current examples of traction battery pack designs utilize an electrical fuse on main current lines between battery cells and battery cell leads which extend out of a traction battery pack. This electrical fusing may prevent large amounts of current from either entering or leaving the traction battery pack. However, electrical fusing configurations in this example may not prevent individual battery cells from short-circuiting because of cost, weight, and space limitations. Battery cells arranged in series to stack up voltage for the traction battery pack design may each deliver the same current level as the overall traction battery pack due to Kirchhoff's laws. As a result, individually fusing each battery cell may require a fuse capable of carrying hundreds of amps to be wired in series potentially hundreds of times, making this approach difficult in terms of cost, weight and volume. Adding an electrical fuse to each individual battery cell may also add complexity to the BECM, additional costs to implement the battery cell electrical system, and an increase in a weight of the battery cell electrical system.

One existing example of a short-circuit prevention method is a positive thermal coefficient (PTC) washer, which is based on the behavior of thermistor resistance relative to temperature change, often described by the Steinhart-Hart equation. Thermistors which incur a decrease in resistance as a function of temperature are known as Negative Temperature Coefficient (NTC) thermistors and are typically used for temperature sensing functions similar to that of a thermocouple. Positive Thermal Coefficient (PTC) materials display an opposite trend in comparison to NTC materials, i.e. resistance increases with temperature, and such PTC materials are often used to limit a current flow in an electrical circuit. In the case of battery cells, PTC washers are located at the terminals internal to the battery cell and intended to alleviate battery cell current levels exceeding acceptable design values. For example, PTC washers are commonly implemented in battery cell designs for the consumer market place such as in 18650 cylindrical cells used in laptop battery designs. These PTC washers may be made of a polymer resin (sometimes with carbon particles interspersed throughout a matrix) having increasing resistance (which may decrease conductivity) as the temperature of the PTC washer rises. These materials can have resistance changes as functions of temperature from ~50 mOhms to >1 kOhm. Typical electrified vehicles use what may be considered high power battery cells with resistances below ~50 mOhms and as a result, PTC washers may be problematic for use in this capacity.

Another example of an existing short-circuit prevention mechanism is as a Charge Interrupt Device (CID). A CID may create an open circuit inside a battery cell as a function of pressure of the battery cell system. For example, as a battery cell approaches an overcharge condition, chemical decomposition of battery cell components creates a gas to raise an internal pressure of the battery cell. The CID is triggered when the internal pressure reaches a certain threshold and creates the open circuit condition.

Figure 2:
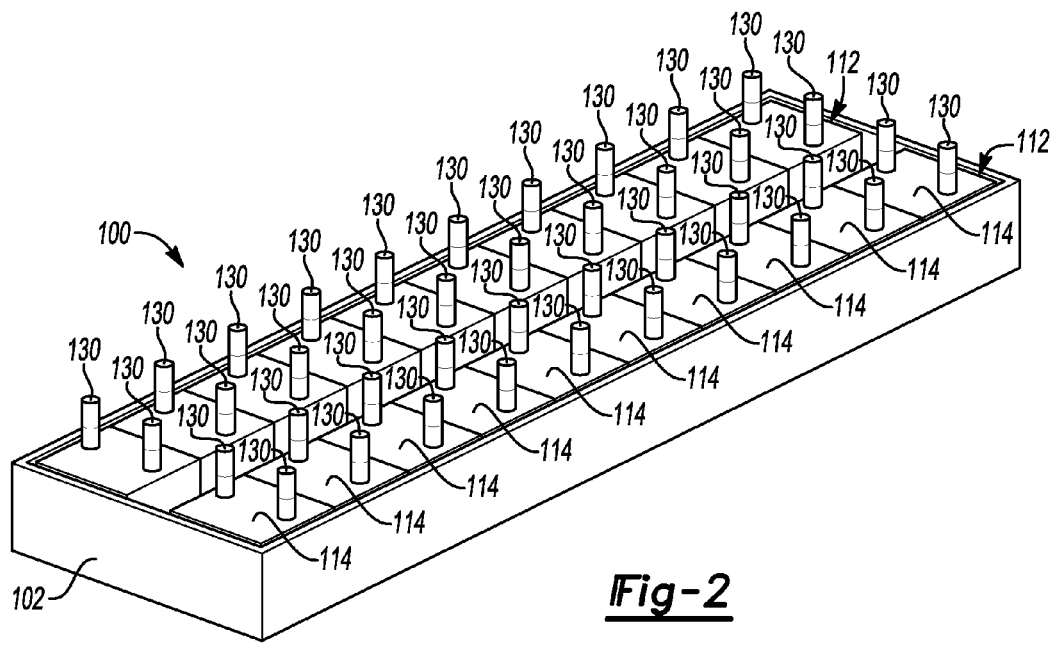
FIG. 2 is a perspective view of an example of a portion of a traction battery assembly including a battery cell array.

FIG. 2 shows an example of a portion of a traction battery assembly generally referred to as a traction battery assembly 100. The traction battery assembly 100 may include a support structure 102. A pair of battery cell arrays 112 may be supported and retained by the support structure 102. The battery cell arrays 112 may each include a plurality of battery cells 114. In this example, the battery cells 114 are prismatic battery cells. It is contemplated that other battery cell construction types, such as cylindrical and pouch cells, may also benefit from the terminal structures described herein.

Figure 3A:
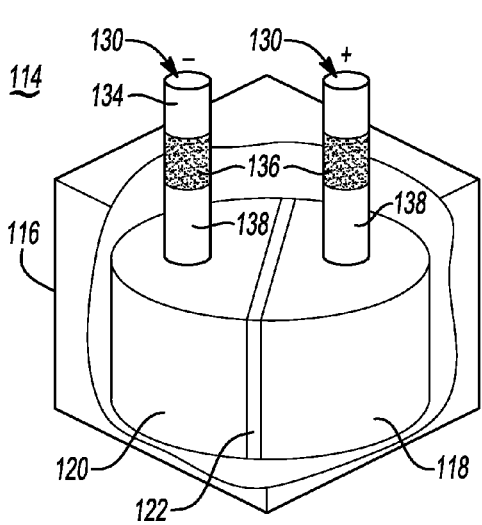
FIG. 3A is a perspective view of an example of a battery cell having a pair of multi-layered terminals in a first configuration and shown with a portion of a housing removed to illustrate internal components.
Figure 3B:
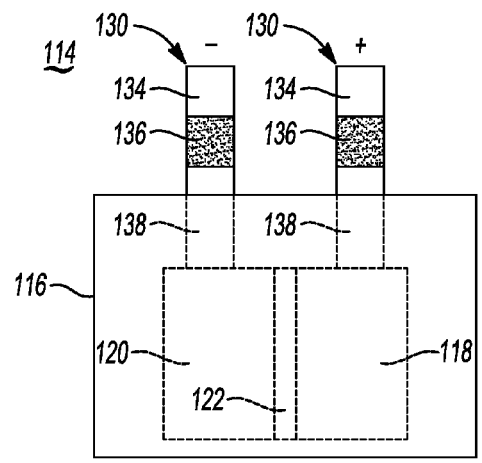
FIG. 3B is a front view the battery cell of FIG. 3A.
Figure 3C:
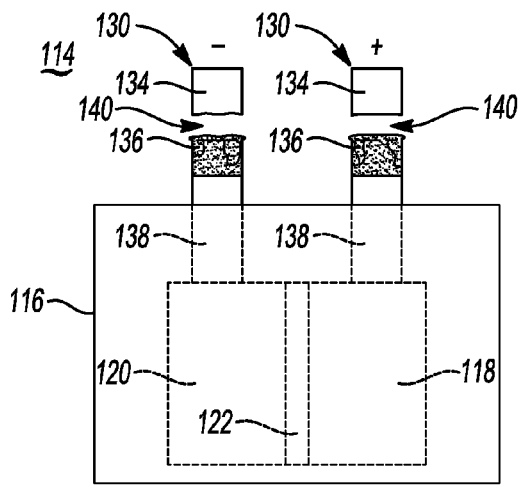
FIG. 3C is a front view of the battery cell of FIG. 3A showing the multi-layered terminals in a second configuration.

FIGS. 3A through 3C show one of the battery cells 114 of the battery cell arrays 112. Each of the battery cells 114 may include a housing 116 to retain a cathode 118, an anode 120, a separator 122, and an electrolyte. The cathode 118 and the anode 120 may facilitate insertion and removal of lithium ions during charge and discharge of the battery cell 114. The electrolyte may provide an ionically conductive path through which the lithium ions may move during charge and discharge. The separator 122 may prevent short-circuit conditions between the cathode 118 and the anode 120 while allowing ions to pass therethrough.

Each of the battery cells 114 may include terminals 130 of opposite polarities and electrically connected with the respective cathode 118 or anode 120. The terminals 130 may include a plurality of layer segments. In one example as shown in FIGS. 3A and 3B, each terminal 130 may include a first layer segment 134, a second layer segment 136, and a third layer segment 138. The second layer segment 136 may be disposed between the first layer segment 134 and the third layer segment 138. The second layer segment 136 may be located outside of the housing 116. The second layer segment 136 may be of a material having a lower melting point than the first layer segment 134 and the third layer segment 138. For example, the first layer segment 134 and the third layer segment 138 may be of a material such as copper or aluminum having melting points of 1,085 C and 660 C, respectively. The second layer segment 136 may be of a material such as indium having a melting point of 157 C or may be other materials which are electrically conductive and include a melting point which is less than that of the first layer segment 134 and the third layer segment 138.

FIGS. 3A and 3B show an example of the battery cell 114 under normal operating conditions with regard to terminal 130 temperatures and current flow. FIG. 3C shows the second layer segment 136 melted as a result of, for example, a temperature increase of the terminal 130 due to current flow which increased a temperature of the terminals 130 to exceed the melting point of the second layer segment 136. In this example, high current flow may increase the temperature of the terminals 130 in comparison to the normal operating conditions. During a short-circuit event, the temperature of the terminals may increase to a short-circuit temperature which may be below a melting point of the first layer segment 134 and the third layer segment 138. In this example, the second layer segment 136 shown melted in FIG. 3C may be a result of the temperature of the terminals 130 increasing to the melting point of the second layer segment 136. The first layer segment 134 and the third layer segment 138 are separated without the second layer segment 136 therebetween which creates an open circuit condition and thus isolates the respective battery cell 114. By using a material having a melting point lower than the short-circuit temperature for the second layer segment 136, the short-circuit condition may be avoided. While a thickness of the second layer segment 136 may vary, the thickness should be such that an air gap 140 is defined between the first layer segment 134 and the third layer segment 138 of a sufficient size to prevent sparking therebetween when the second layer segment 136 has melted. In one example the air gap defines a space between the first layer segment 134 and the third layer segment 138 which is one millimeter or greater.

Alternative materials may be selected for the second layer segment 136 which include properties appropriate for a particular battery cell and/or battery cell system. These additional materials may be of a single element or may be of an alloy having desired characteristics, such as a preselected melting point, to assist in preventing short-circuit conditions. For example, materials having melting points above ambient temperatures are desired so that the second layer segment 136 does not melt under normal operating conditions. Further, materials having melting points which are comparable to temperatures which trigger thermal runaway may not be desirable. In one example, a melting point of a selected material for the second layer segment 136 may be based on a ratio of a resistance of the battery cell 114 and a current load applied to the terminal 130.

Figure 4A:
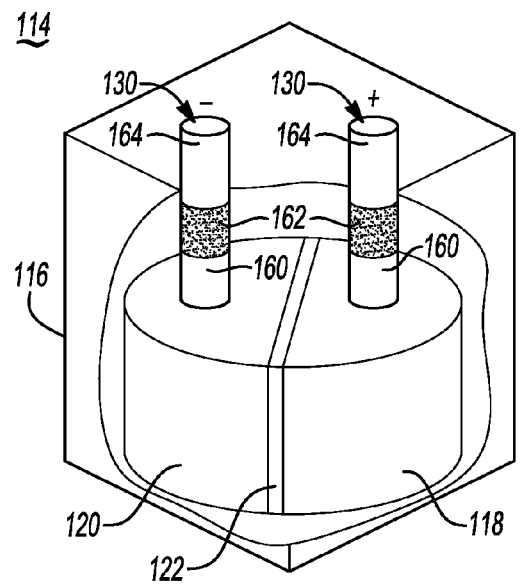
FIG. 4A is a perspective view of the battery cell of FIG. 3A having another pair of multi-layered terminals in another example of a first configuration.
Figure 4B:
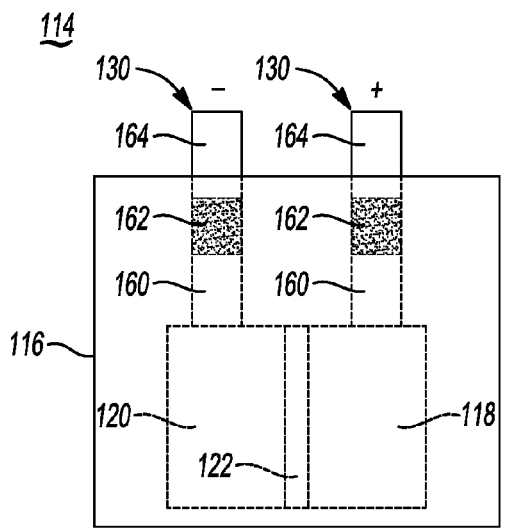
FIG. 4B is a front view of the battery cell of FIG. 4A.
Figure 4C:
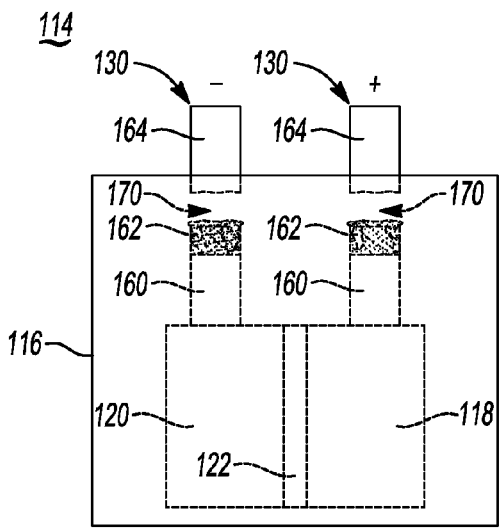
FIG. 4C is a front view of the battery cell of FIG. 4A showing the multi-layered terminals in another example of a second configuration.

In another example as shown in FIGS. 4A through 4C, each terminal 130 may include a lower layer segment 160, a middle layer segment 162, and an upper layer segment 164. The middle layer segment 162 may be disposed between the lower layer segment 160 and the upper layer segment 164. The middle layer segment 162 may be located within the housing 116. The middle layer segment 162 may be of a material having a lower melting point than the lower layer segment 160 and the upper layer segment 164. For example, the lower layer segment 160 and the upper layer segment 164 may be of a material such as copper or aluminum having melting points of 1,085 C and 660 C, respectively. The middle layer segment 162 may be of a material such as Indium having a melting point of 157 C or may be of other materials which are electrically conductive and include a melting point which is less than that of the lower layer segment 160 and the upper layer segment 164. In another example, the middle layer segment 162 may be a metal alloy having a melting point between seventy five degrees Celsius and one hundred and thirty degrees Celsius.

FIGS. 4A and 4B show another example of the battery cell 114 under normal operating conditions with regard to terminal 130 temperatures and current flow. FIG. 4C shows the middle layer segment 162 melted as a result of, for example, a temperature increase of the terminal 130 due to current flow which exceeded the melting point of the middle layer segment 162. In this example, high current flow may increase the temperature of the terminals 130 in comparison to the normal operating conditions. During a short-circuit event, the temperature of the terminals may increase to a short-circuit temperature which may be below a melting point of the upper layer segment 164 and the lower layer segment 160. In this example, the middle layer segment 162 shown melted in FIG. 3C may be the result of the temperature of the terminals 130 increasing to the melting point of the middle layer segment 162. The upper layer segment 164 and the lower layer segment 160 are separated without the middle layer segment 162 therebetween which creates an open circuit condition and thus isolates the battery cell 114. By using a material having a melting point lower than the short-circuit temperature for the middle layer segment 162, the short-circuit condition may be avoided. While a thickness of the middle layer segment 162 may vary, the thickness should be such that an air gap 170 is defined between the upper layer segment 164 and the lower layer segment 160 of a sufficient size to prevent sparking between the upper layer segment 164 and the lower layer segment 160 when the middle layer segment 162 has melted.

Alternative materials may be selected for the middle layer segment 162 which include properties appropriate for a particular battery cell and/or battery cell system. These additional materials may be of a single element or may be of an alloy having desired characteristics, such as melting point, to assist in preventing short-circuit conditions. For example, materials having melting points above ambient temperatures are desired so that the middle layer segment 162 does not melt under normal operating conditions. Further, materials having melting points which are comparable to temperatures which trigger thermal runaway may not be desirable. In one example, a melting point of a selected material for the middle layer segment 162 may be based on a ratio of resistance of the battery cell 114 and a current load applied to the terminal 130.

The examples of terminals 130 for the battery cells 114 having layered segments of materials with different melting points provide several advantages over the above described electrical fuses, PTC washer, and CID. For example and in comparison to the electric fuses described above, the multi-layered terminals require fewer components and may reduce weight of the battery systems and may reduce implementation costs while simultaneously providing multiple fusing locations. As another example and in comparison to the PTC washer, the multi-layered terminals are more compatible with the relatively low resistance battery cells used in electrified vehicles. As yet another example and in comparison to the CID, the multi-layered terminals are less complex and create a stronger correlation between large current flow and an interruption of the current path within the battery cell to alleviate a potential for a large discharge to occur during which no significant gas is generated and as a result no triggering of the CID is likely and/or situations in which the timescales of gas generation are longer then short-circuit onset which is to be avoided. Additionally, it is more mechanically difficult to implement PTC, CID and vent releases in pouch cells in comparison to the multi-layered terminal approach described herein.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle traction battery assembly comprising:
an array of battery cells, each of the cells including terminals of opposite polarity, each of the terminals having an upper portion and a plurality of segment layers, wherein at least one of the segment layers of each of the terminals is within a battery cell housing and has a melting point less than that of adjacent layers and the upper portion extends out of the battery cell housing.

2. The assembly of claim 1, wherein one of the cells is electrically isolated from other of the cells in response to at least one of the segment layers of the terminals of the one of the cells melting.

3. The assembly of claim 1, wherein for each of the terminals, the plurality of segment layers are arranged such that the adjacent segment layers on either side of the at least one of the segment layers are disconnected from one another in response to the at least one of the segment layers melting.

4. The assembly of claim 1, wherein for each of the terminals, the adjacent segment layers on either side of the at least one of the segment layers are copper or aluminum.

5. The assembly of claim 4, wherein for each of the terminals, the at least one of the segment layers is indium.

6. A vehicle traction battery cell comprising:
an electrochemical cell disposed within a housing; and
first and second terminals of opposite polarity electrically connected with the cell and extending outside the housing, the terminals each including a conductive segment disposed between lower and upper layers of the terminal within the housing, and having a melting point less than the layers.

7. The battery cell of claim 6, wherein the melting point is equal to or less than a predefined temperature associated with a short-circuit condition of the cell.

8. The battery cell of claim 6, wherein the melting point is less than a terminal temperature at which thermal runaway of the cell occurs.

9. The battery cell of claim 6, wherein the conductive segment is a metal alloy and the melting point is between seventy-five degrees Celsius and one hundred and thirty degrees Celsius.

10. The battery cell of claim 6, wherein the conductive segment is sized such that, in response to the conductive segment melting, a gap forms between the lower and upper layers sufficient to prevent sparking between the lower and upper layers.

11. A vehicle comprising:
an electric machine; and
an array of battery cells electrically connected to the electric machine, each of the cells configured to convert chemical energy to electrical energy and including
a housing, and
first and second terminals of opposite polarity electrically connected to the cell, each of the terminals extending outside of the housing and defining lower and upper layers and a middle layer disposed therebetween and within the housing of a material having a melting point defined by a terminal temperature at which a short-circuit condition of the cell occurs and being less than a melting point of the lower and upper layers.

12. The vehicle of claim 11, wherein one of the cells of the array is isolated from the rest of the cells of the array in response to the middle layers of the terminals of the one of the cells melting.

13. The vehicle of claim 11, wherein the lower and upper layers are disconnected when the middle layers melt.

14. The vehicle of claim 11, wherein the middle layers are made of indium.

* * * * *